(12) United States Patent
Takahashi (10) Patent No.: US 7,726,723 B2
(45) Date of Patent: Jun. 1, 2010

(54) SLIDE DOOR STRUCTURE OF AUTOMOBILE

(76) Inventor: Hisashi Takahashi, 23-16, Daishuku 2-chome, Toride-shi, Ibaraki, 3020013 (JP)

(*) Notice: Subject to any disclaimer, the term of this patent is extended or adjusted under 35 U.S.C. 154(b) by 201 days.

(21) Appl. No.: 11/988,162

(22) PCT Filed: Jul. 4, 2006

(86) PCT No.: PCT/JP2006/313322
§ 371 (c)(1),
(2), (4) Date: Jan. 2, 2008

(87) PCT Pub. No.: WO2007/004651
PCT Pub. Date: Jan. 11, 2007

(65) Prior Publication Data
US 2009/0212592 A1    Aug. 27, 2009

(30) Foreign Application Priority Data
Jul. 5, 2005  (JP) .............................. 2005-196013

(51) Int. Cl.
*B60J 7/00* (2006.01)
(52) U.S. Cl. ........................................ 296/155; 49/370
(58) Field of Classification Search ................. 296/155; 49/370
See application file for complete search history.

(56) References Cited
U.S. PATENT DOCUMENTS 3,501,864 A * 3/1970 Gerhard et al. ................. 49/215
4,157,846 A * 6/1979 Whitcroft .................... 296/155
4,544,198 A * 10/1985 Ochiai et al. ................. 296/155
6,779,832 B2 * 8/2004 D'Assumcao ............... 296/155

FOREIGN PATENT DOCUMENTS

| JP | 1984-135227 | 9/1984 |
|----|-------------|--------|
| JP | 1985-14080 | 1/1985 |
| JP | 04-244422 | 9/1992 |
| JP | 1994-12142 | 2/1994 |
| JP | 2002-266554 | 9/2002 |
| JP | 2005-133379 | 5/2005 |
| WO | WO-2005/007431 | 1/2005 |

* cited by examiner

*Primary Examiner*—Joseph D Pape
(74) *Attorney, Agent, or Firm*—Edwards Angell Palmer & Dodge LLP (57) ABSTRACT

A slide door structure of an automobile which enables occupants to get in and out with ease even in a narrow parking space because the door of the automobile can be largely opened and capable of reducing the constraints on the design of the body of the automobile. Forward lower rail boards (11, 13) are positioned on the lower part of the body (1) at the front of a rear wheel house (5) when the slide doors (2, 3) are closed and, when the slide doors (2, 3) are opened, extracted from the front side of the rear wheel house (5) to the outside rear side of the body (1) by the rotation of a front link mechanism, and a rear lower rail board (12) is positioned on the lower part of the body (1) at the rear of the rear wheel house (5) when the slide doors (2, 3) are closed and, when the slide doors (2, 3) are opened, extracted from the rear side of the rear wheel house (5) to the outside front side of the body (1) by the rotation of a rear link mechanism.

5 Claims, 14 Drawing Sheets

SLIDE DOOR STRUCTURE OF AUTOMOBILE

BACKGROUND OF THE INVENTION

1. Field of the Invention

The present invention relates to a slide door structure of an automobile, and more particularly to a slide door structure of an automobile which can slide and open both a front door and a rear door to a rear side of a vehicle body.

2. Description of the Related Art

A door of an automobile which open and closes to the right and left sides by a hinge mechanism is generally well-known. However, in the case of opening and closing the door mentioned above so as to get in and out of the vehicle, a space for which a passenger getting in and out can avoid any interference with the door so as to pass is necessary in a side of the vehicle. In the case that a sufficient width is not obtained even if the space is secured, it is necessary to pass through a narrow space in an unnatural posture, and many problems are generated for an aged person and a handicapped person. Further, in a road having a lot of traffic or the like, there is a risk that a person, a vehicle, a bicycle or the like comes into collision with the wide-open door and a great accident or the like is triggered, so that adequate care is necessary.

As one method for solving the problem mentioned above, there is a slide door. In the slide door, because the door is opened and closed by moving the door backward and forward, it is possible to completely leave open an opening portion in a side surface of the vehicle, which is different from the hinge type door, the slide door is user friendly and convenient in the case that the person comes in and out between inner and outer sides of a passenger room or the case that the person carries a load in and out. There is obtained an advantage that it is possible to get in and out of the vehicle parked in a narrow parking space without any difficulty, and the slide door is particularly convenient for the aged person and the handicapped person.

In this case, in the conventional slide door for the automobile, it is often the case that only one of the front door and the rear door is generally of the slide type, and it is often the case that the front door is of a type which must be moved forward to be opened, and the rear door is of a type which must be moved backward so as to be opened (for example, refer to patent document 1 and patent document 2).

However, in the case that only one door is of the slide type, it is not possible to completely make good use of the advantage of the slide type so as to obtain a wide opening, and there is left the problem that it is necessary to pay attention to open and close the other side door which is not of the slide type.

Further, a structure in which both the doors are slid backward and forward (for example, refer to patent document 3) becomes ungainly, and is better adapted to a particular intended use such as a camper or the like. However, there is generated a problem that a vehicle body design is not well thought out, in a passenger car.

Patent Document 1: Japanese Unexamined Patent Publication No. 2004-50877

Patent Document 2: Japanese Unexamined Patent Publication No. 2005-81878

Patent Document 3: Japanese Unexamined Patent Publication No. 2005-88811

SUMMARY OF THE INVENTION

As mentioned above, in the conventional slide type door, it is often the case that only one of the front door and the rear door is of the slide type, or the front door is slid forward and the rear door is slid backward, respectively even if both the doors are of the slide type. However, according to these methods, there is a problem that the advantage of the slide type door might not be sufficiently put to good use, a restriction is generated in a design of a vehicle body, and an outer appearance is degraded.

An object of the present invention is to provide a slide door structure of an automobile which can solve the problems mentioned above, can widely open a door by opening a front door and a rear door backward, can allow an occupant to get in and out without any difficulty even in a narrow parking space, and can reduce the number of restrictions on a design of a vehicle body.

In order to solve the problem mentioned above, according to the present invention, there is provided a slide door structure of an automobile supporting slide doors by a plurality of lower rail boards held by a link mechanism from a lower side of a vehicle body, wherein a forward side lower rail board exists in a lower portion of the vehicle body in a front side of a rear wheel house at a door closed time in a state in which the slide door is closed, and is drawn out toward a rear side in an outer side of the vehicle body from a front side of the rear wheel house, on the basis of a rotation of a forward link mechanism at a door open time in a state in which the slide door is opened, and a backward side lower rail board exists in the lower portion of the vehicle body in a rear side of the rear wheel house at a door contained time in a state in which the slide door is closed, and is drawn out toward a front side in the outer side of the vehicle body from the rear side of the rear wheel house on the basis of a rotation of a backward link mechanism at a door expanded time in a state in which the slide door is opened.

In order to solve the problem mentioned above, according to the present invention, a slide door structure of an automobile, the slide doors are formed of a front door and a rear door, the rear door being guided by a first slider sliding along a first upper guide rail provided in an upper side portion of the vehicle body, a second slider sliding along a first center guide rail provided in a side portion of the vehicle body, and a third slider sliding along a first lower guide rail provided in common in a front side lower rail board for the rear door and a rear side lower rail board for the rear door, and which slides backward at a time of being opened and forward at a time of being closed. The front door is guided by a fourth slider sliding along a second upper guide rail provided in an upper side portion of the vehicle body, a fifth slider sliding along a second center guide rail provided in the rear door side portion and a sixth slider sliding along a second lower guide rail provided in a front side lower rail board for the front door, and slides backward at a time of being opened and forward at a time of being closed.

In order to solve the problem mentioned above, according to the present invention, there is provided a slide door structure of an automobile, wherein the slider supports the slide door to a main body of the vehicle body via a support arm, and the support arm slides backward after being drawn out to an outer side from the vehicle body side portion at a predetermined distance from a position at which the slide door is closed, at a time of opening the slide door.

In order to solve the problem mentioned above, according to the present invention, there is provided a slide door structure of an automobile supporting a slide door from a lower side of a vehicle body by a lower rail board guided by a slide rail mechanism, wherein the lower rail board exists in a lower portion of the vehicle body in a front side of a rear wheel house at a door closed time in a state in which the slide door is closed, and is drawn out toward an outer side of the vehicle body by the slide rail mechanism, and a sub rail board provided in the lower rail board is drawn out to a rear side of the vehicle from the lower rail board so as to support the slide door.

In order to solve the problem mentioned above, according to the present invention, a slide door structure of an automobile is formed of a front door and a rear door, and driving wheels provided in a lower surface in a front side of both the doors are guided and moved by guide grooves provided in the lower rail board and the sub rail board so as to be opened and closed.

According to the slide door structure of the present invention, because both the front door and the rear door can slide to the rear side so as to be opened, it is possible to secure a wide opening, and it is possible to safely and easily get in and out from the vehicle parked in a narrow parking space. Further, because the slide rail does not get into an indoor side of a driver's seat and an assistant driver seat, it is possible to make the room inside wide and the slide rail does not form an obstacle to driving. Further, there are few restrictions on the design of an outer appearance of the vehicle and a freedom thereof is large, it is possible to improve an outer appearance.

DETAILED DESCRIPTION OF EXEMPLARY EMBODIMENTS

A description will be given in detail of the present invention with reference to the accompanying drawings.

Figure 1:
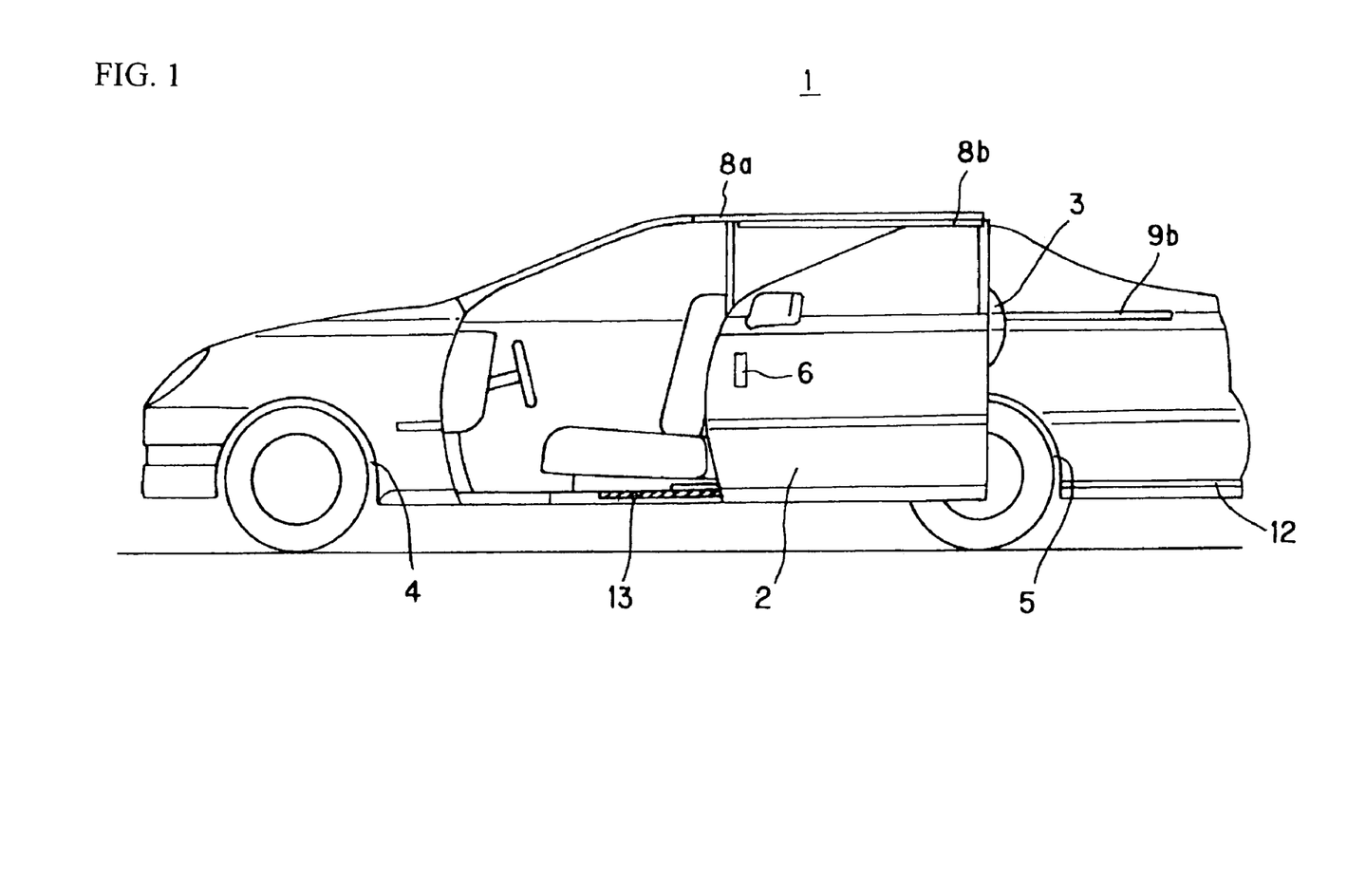
FIG. 1 is a side elevational view of an outer appearance of a passenger car employing a first exemplary embodiment of a slide door structure according to the present invention.
Figure 2:
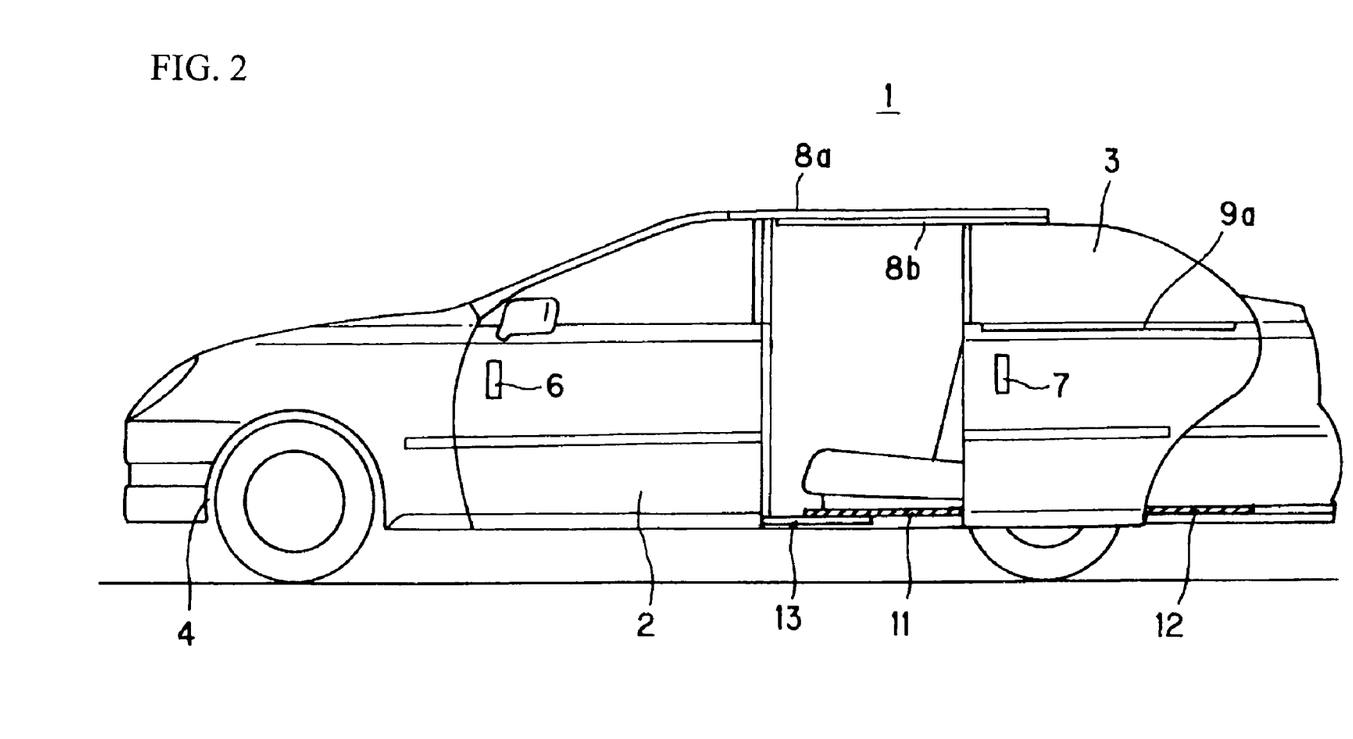
FIG. 2 is a side elevational view of an outer appearance of a state in which a front door of the passenger car in FIG. 1 is open.
Figure 3:
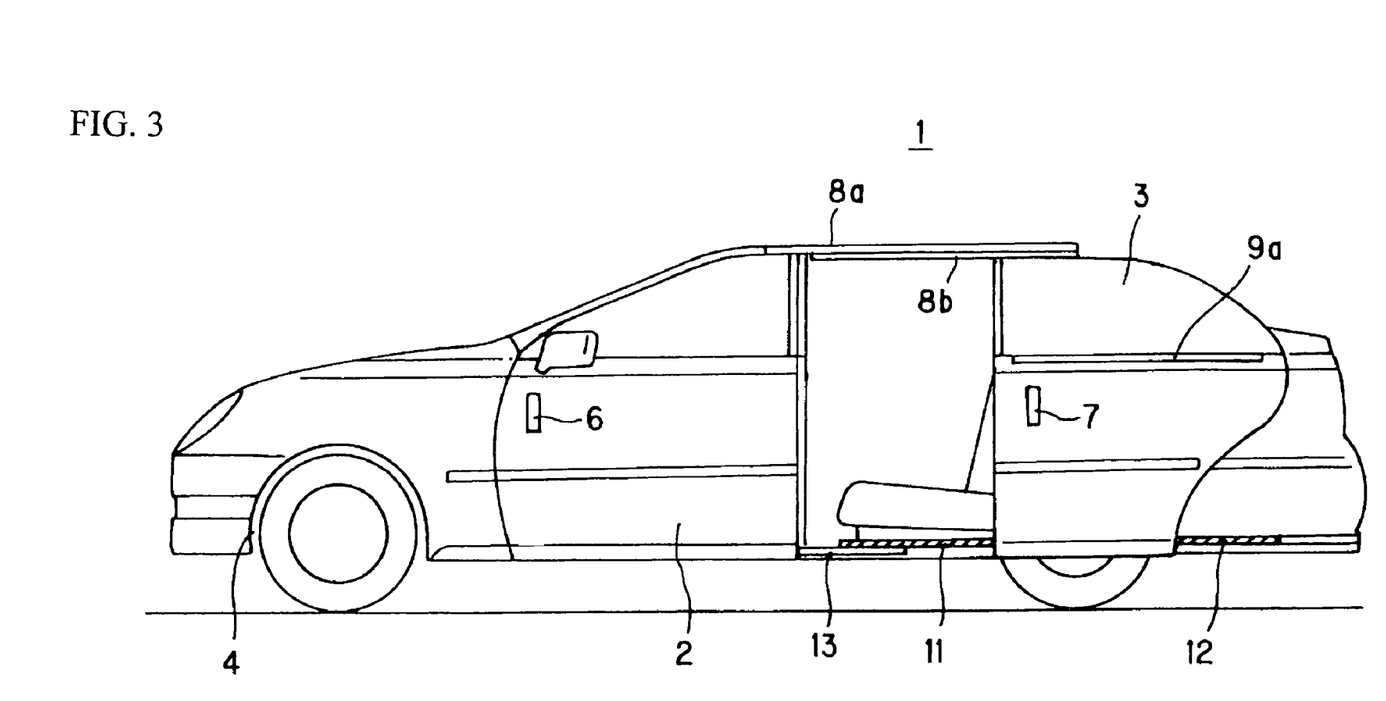
FIG. 3 is a side elevational view of an outer appearance of a state in which a rear door of the passenger car in FIG. 1 is open.
Figure 4:
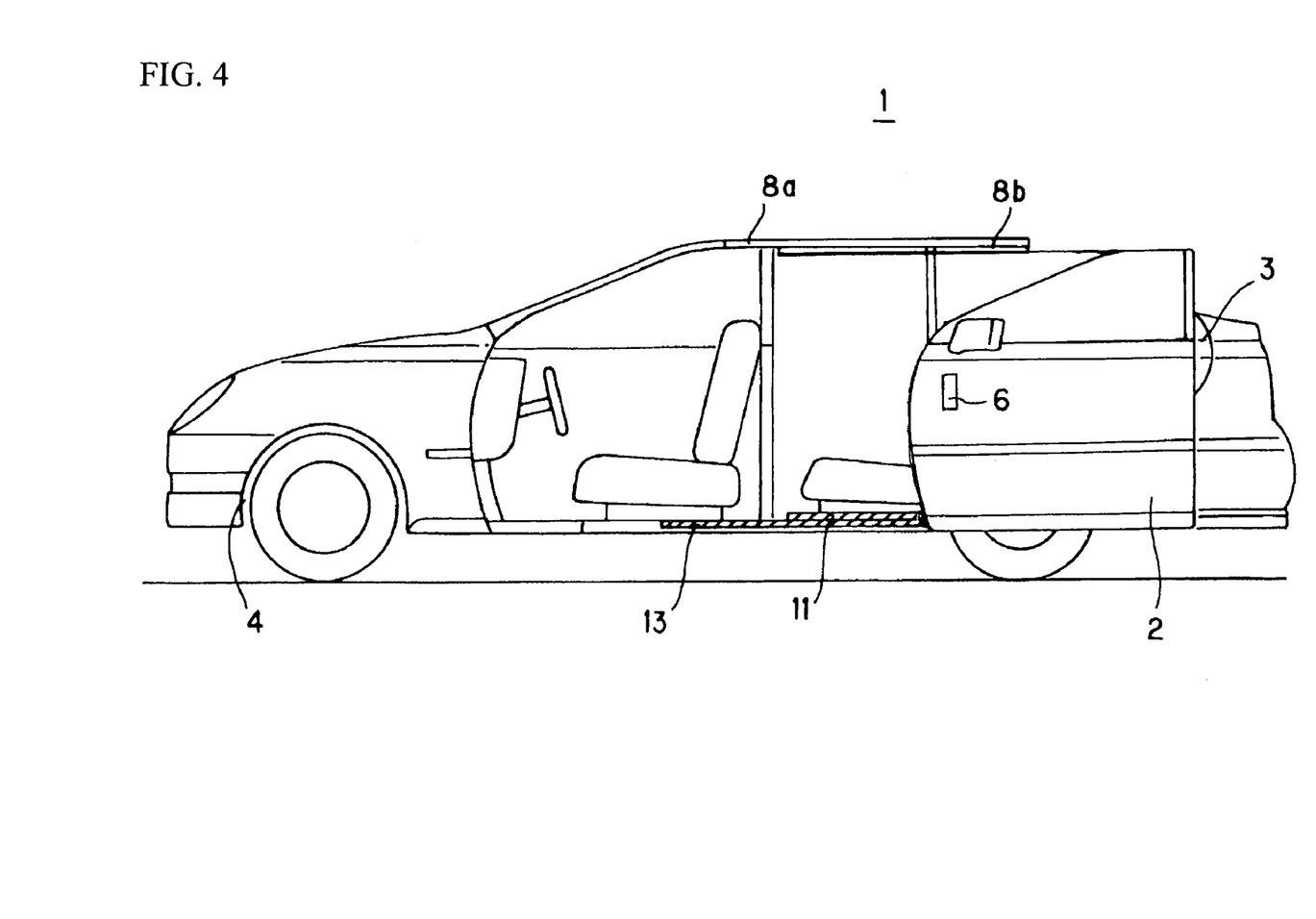
FIG. 4 is a side elevational view of an outer appearance of a state in which the front door and the rear door of the passenger car in FIG. 1 are open.

FIG. 1 shows a side elevational view of an outer appearance of a passenger car having a slide door according to an exemplary embodiment of the present invention. Further, FIGS. 2, 3 and 4 are side elevational views of the outer appearance of the passenger car in a state in which the slide doors are open. In the present invention, the doors are structured such that both a front door and a rear door are opened by sliding them rearward, and are structured such that only the front door can be slid to be opened as shown in FIG. 2, only the rear door can be slid so as to be opened as shown in FIG. 3, and both the doors can be slid to a rear side so as to be opened, as shown in FIG. 4. In FIGS. 1 to 4, reference numeral 1 denotes a vehicle body, reference numeral 2 denotes a front door, reference numeral denotes a rear door, reference numeral 4 denotes a front wheel house, reference numeral 5 denotes a rear wheel house, reference numeral 6 denotes a front door handle, reference numeral 7 denotes a rear door handle, reference symbol 8a denotes an upper guide rail for the front door, reference symbol 8b denotes an upper guide rail for the rear door, reference symbol 9a denotes a center guide rail for the front door, reference symbol 9b denotes a center guide rail for the rear door, reference numeral 11 denotes a front side lower rail board for the rear door, reference numeral 12 denotes a rear side lower rail board for the rear door, and reference numeral 13 denotes a front side lower rail board for the front door.

Because both the front door 2 and the rear door 3 have the slide opening and closing structure as mentioned above, it is possible to widely open a side surface of the vehicle at a time of getting in and out of the vehicle, and there is an advantage that it is possible to get in and out of the vehicle parked in a narrow parking space without any difficulty. Particularly, safety and convenience can be obtained for an aged person and a handicapped person.

The structure mentioned above can be achieved by employing a structure for supporting the slide door from a lower side of the vehicle body by a plurality of lower rail boards held by a link mechanism, and by employing a two-stage traction structure in a supporting arm guiding the slide door to the guide rail.

Figure 5:
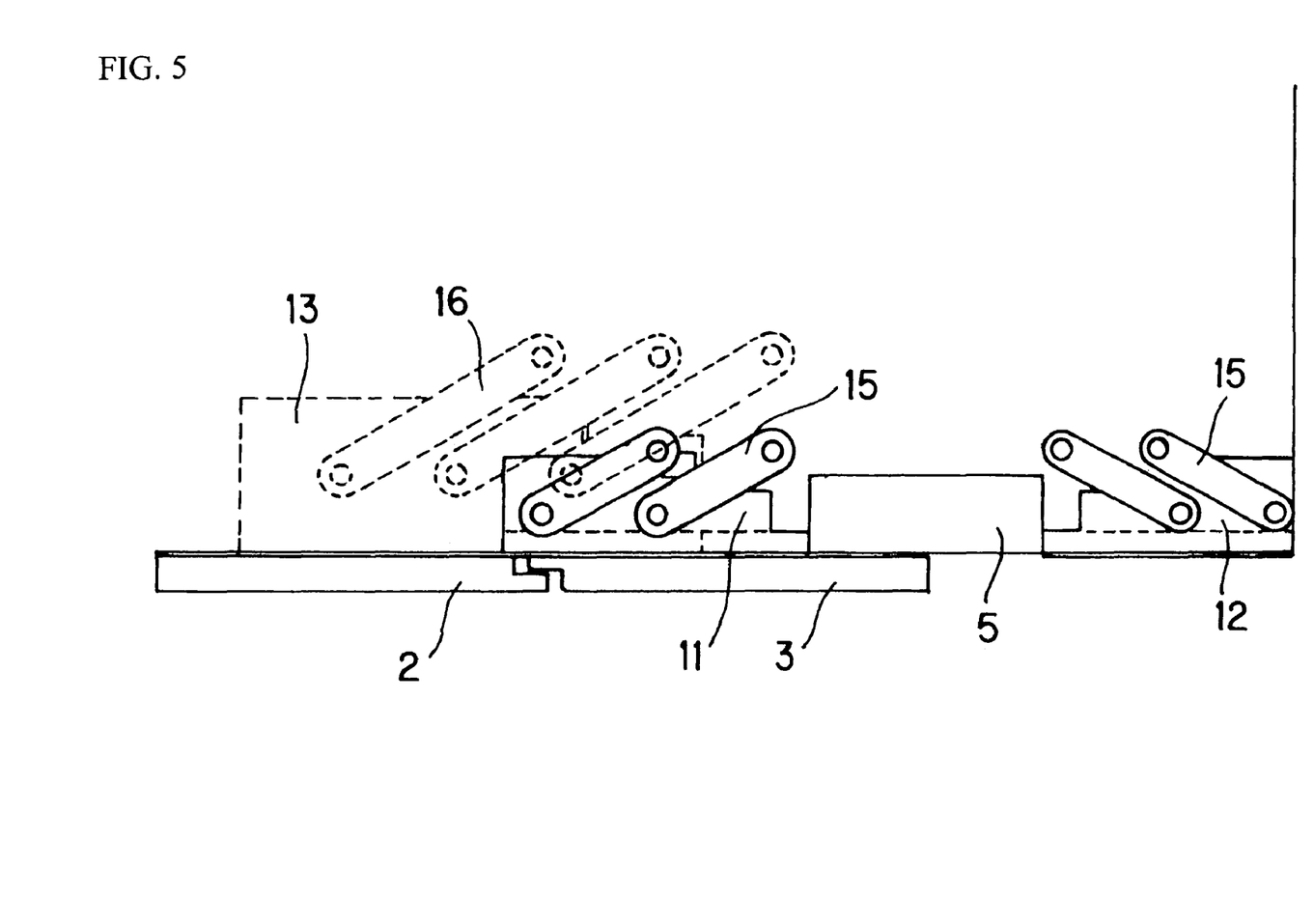
FIG. 5 is an explanatory view showing a structure of a lower rail board used in the slide door structure according to the present invention.
Figure 6:
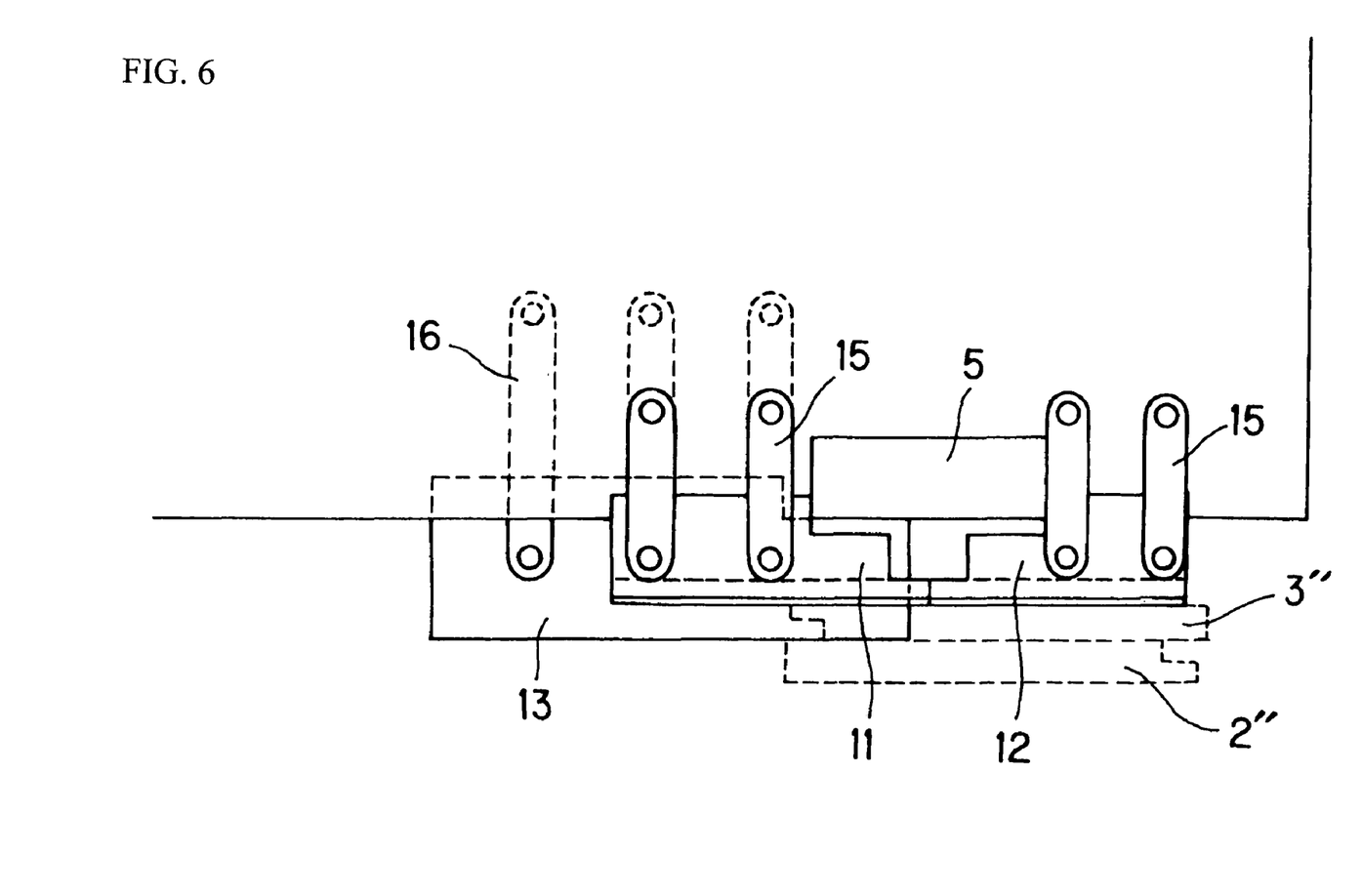
FIG. 6 is an explanatory view showing the structure of the lower rail board used in the slide door structure according to the present invention.
Figure 7:
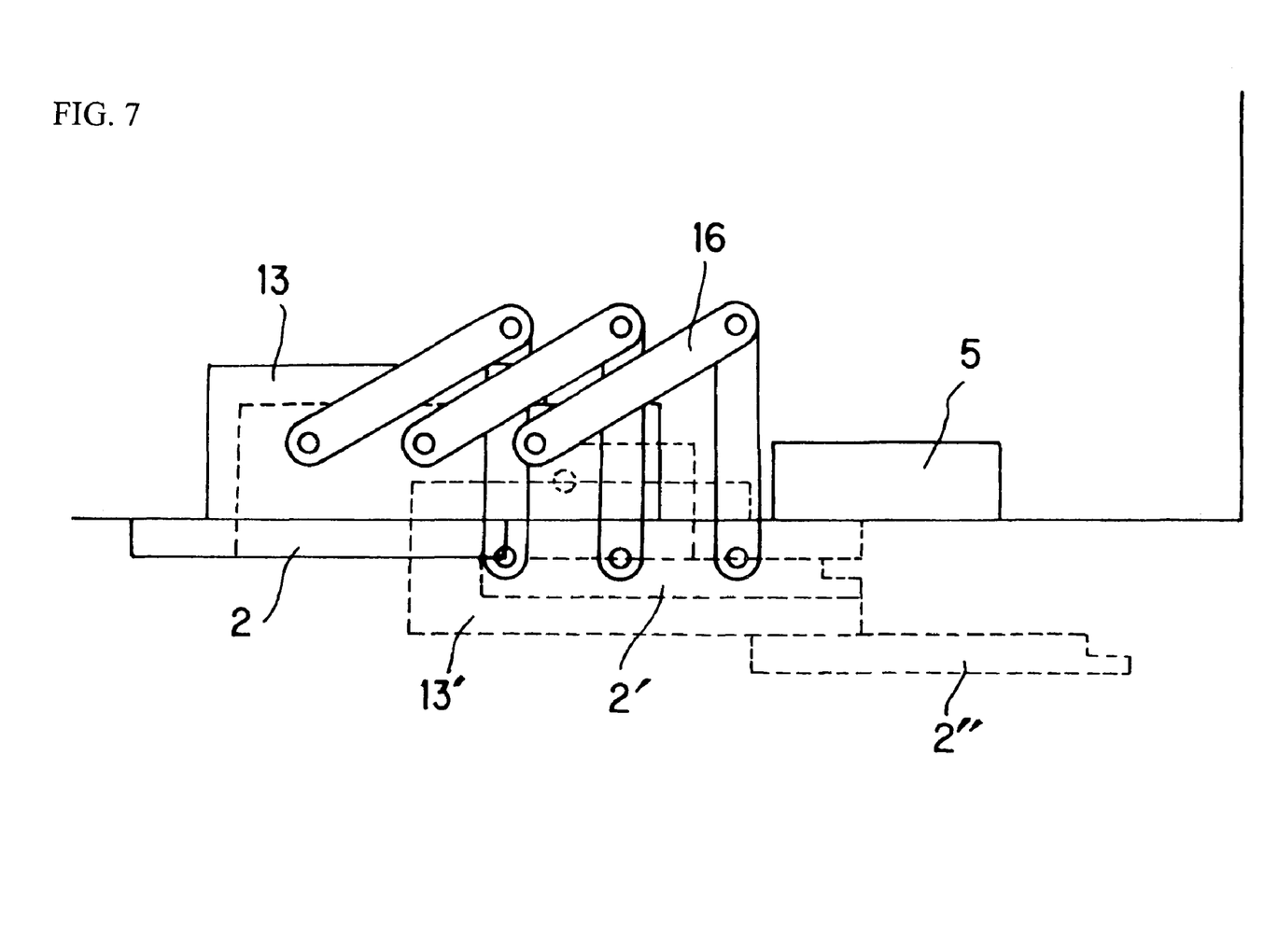
FIG. 7 is an explanatory view showing the structure of the lower rail board used in the slide door structure according to the present invention.

FIGS. 5, 6 and 7 are explanatory views showing a structure of the lower rail board according to the present invention. FIG. 5 shows a position of each of the lower rail boards in a state in which the front door 2 and the rear door 3 are closed, and FIG. 6 shows a position of each of the lower rail boards in a state in which the front door 2 and the rear door 3 are open. Further, FIG. 7 shows a position at a time when the front side lower rail board is opened and closed.

In FIGS. 5, 6 and 7, reference numeral 15 denotes a rotating arm of the rear door side lower rail board, reference numeral 16 denotes a rotating arm of the front door side lower rail board, and the other reference numerals are the same as those of FIGS. 1 to 4.

A description will be given of an opening and closing motion of the door, a motion of the supporting arm together with the opening and closing motion and a motion of the lower rail board.

The front door 2 and the rear door 3 are supported by the main body of the vehicle body 1 on the basis of an engagement of a slider provided in a leading end of the supporting arm (not shown) with a guide rail, and the slider slides within the guide rail, thereby being opened and closed.

In a state in which the front door 2 is closed, a fourth slider existing at a leading end of the front door upper supporting arm provided in an upper side of the front door 2 is engaged with the upper guide rail 8a for the front door, and a sixth slider existing at a leading end of the front door lower supporting arm provided in a lower side of the front door 2 is engaged with the lower guide rail for the front door provided in the front side lower rail board 13 for the front door.

In the case of opening only the front door 2, the front door handle 6 of the front door 2 is first drawn out to a near side. Then, the front door 2 is drawn out against a spring provided in an inner portion of the front door upper supporting arm and the front door lower supporting arm in such a manner as to rise to the near side at a predetermined height. The front door upper supporting arm and the front door lower supporting arm are locked at the rising position.

Thereafter, if the front door 2 is slid to a rear side of the vehicle body, a fifth slider in a leading end of the front door center supporting arm provided at the midpoint of the front door 2 is engaged with the center guide rail 9a for the front door provided in a side surface of the rear door 3, and the fifth slider can slide in the center guide rail for the front door. Accordingly, the front door 2 is guided by a slider moving in three guide rails comprising the upper guide rail 8a for the front door, the center guide rail 9a for the front door and the lower guide rail for the front door so as to be slid, and is opened in a state as shown in FIG. 2.

Next, a case that only the rear door 3 is opened is considered. In a state in which the rear door 3 is closed, a first slider existing in a leading end of the rear door upper supporting arm provided in an upper side of the rear door 3 is engaged with the upper guide rail 8b for the rear door, and a third slider existing in a leading end of the rear door lower supporting arm provided in a lower side of the rear door 3 is engaged with the lower guide rail for the rear door provided in the front side lower rail board 11 for the rear door.

In the case of opening only the rear door 3, the rear door handle 7 of the rear door 3 is first drawn out to a near side. Then, the rear door 3 is drawn out against a spring provided in an inner portion of the rear door upper supporting arm and the rear door lower supporting arm in such a manner as to rise to the near side. The rear door upper supporting arm and the rear door lower supporting arm are locked at the rising position.

Thereafter, if the rear door 3 is slid to the rear side of the vehicle body 1, a second slider in a leading end of the rear door center supporting arm provided at the midpoint of the rear door 3 is engaged with the center guide rail 9b for the rear door provided in the side portion of the vehicle body, and can slide in the center guide rail for the rear door. Accordingly, the rear door 3 is guided by a slider moving in three guide rails comprising the upper guide rail 8b for the rear door, the center guide rail 9b for the rear door and the lower guide rail for the rear door so as to be slid, and is opened in a state as shown in FIG. 3.

Next, a case that both the front door 2 and the rear door 3 are opened to the rear side is considered. If the front door 2 is further moved to the rear side of the vehicle body from the state in which only the front door 2 in FIG. 2 is open, both the doors are locked to each other so as to be combined at a position where the front door 2 and the rear door 3 are overlapped. In a state in which the front door 2 and the rear door 3 are combined, it is possible to integrally control the front door 2 and the rear door 3 by the front door handle 6 of the front door 2. In this state, if the front door handle 6 is drawn to the rear side, the front door 2 and the rear door 3 are integrally moved to the rear side.

The combination of the front door 2 and the rear door 3 is guided by five guide rails comprising the upper guide rail 8a for the front door, the lower guide rail for the front door, the upper guide rail 8b for the rear door, the center guide rail 9b for the rear door and the lower guide rail for the rear door, at the beginning, and is guided by four guide rails from the midstream because the upper guide rail 8a for the front door is disengaged as a result of its short length, thereby being slid.

In this case, a description will be given of a motion of the lower rail boards 11, 12 and 13, and the rotating arms 15 and 16 used for driving the lower rail boards 11, 12 and 13.

FIG. 5 shows a positional relation between the front side lower rail board 11 for the rear door, the rear side lower rail board 12 for the rear door and the front side lower rail board 13 for the front door in the state in which the front door 2 and the rear door 3 are closed.

In the state in which the front door 2 and the rear door 3 are closed, the rotating arms 15 and 16 are bent in a direction extending along the side surface of the vehicle body 1, as shown in FIG. 5, and the lower rail boards 11, 12 and 13 are folded below the vehicle body 1.

FIG. 6 shows a positional relation between the front side lower rail board 11 for the rear door, the rear side lower rail board 12 for the rear door and the front side lower rail board 13 for the front door, rotating arms 15 and 16 in the state in which the front door 2 and the rear door 3 are fully open as shown in FIG. 4. In the state in which the doors 2 and 3 are fully open, the rotating arms 15 and 16 rise up in a vertical direction to the side surface of the vehicle body 1.

If the rotating arms 15 and 16 are moved to the state in FIG. 6 from the state in FIG. 5, the lower rail boards 11 and 13 are drawn out to a rear side surface from a front side of the vehicle body 1, and the lower rail board 12 is drawn out to a front side surface from a rear side of the vehicle body 1. Further, the front side lower rail board 11 for the rear door is brought into contact with the rear side lower rail board 12 for the rear door in an outer side of the rear wheel house 5, and the lower guide rails for the rear door respectively provided on the lower rail boards 11 and 12 are connected to one.

FIG. 7 is a view showing a relation between the front side lower rail board 13 for the front door and the opened and closed state of the front door 2. In the state in which the front door 2 is closed, the front side lower rail board 13 for the front door is folded below the vehicle body 1, and the front door 2 exists at a position 2. In this case, the front door handle 6 of the front door 2 is drawn out to the near side for opening only the front door 2. Then, the front door 2 is drawn out to the near side in such a manner as to rise up at a predetermined height. In this state, if the front door 2 is slid to the rear side of the vehicle body, the front door 2 and the rear door 3 are fitted, and the front door 2 is finally opened to a state shown in FIG. 2. The position of the front door 2 at this time is changed to a position 2' indicated by a dotted line in FIG. 7.

Further, in a state in which the front door 2 and the rear door 3 are integrally slid to the rear side and both the doors are fully open as shown in FIG. 4, the front side lower rail board 13 is changed to a position 13' indicated by a dotted line in FIG. 7, and the front door 2 is changed to a position 2".

As mentioned above, because the front door 2 and the rear door 3 of the slide door are structured such as to be supported by the lower guide rails provided in the lower rail boards 11, 12 and 13, both the front door 2 and the rear door 3 can be slid to the rear side of the rear wheel house so as to be opened, whereby it is possible to secure a wide opening. Accordingly, it is possible to safely and easily get in and out of the vehicle parked in a narrow parking space.

It is possible to make the room inside wide without the slide rail entering into the room inside of the driver seat and the assistant driver seat, and the slide does not form an obstacle to the driving.

Because a restriction of design of the outer appearance of the vehicle is small and a freedom thereof is large, it is possible to improve an appearance of the outer appearance.

Next, a description will be given of a second embodiment of the slide door structure according to the present invention with reference to FIGS. 8 to 15.

In this second embodiment, the structure is made such that the lower rail board is drawn out to an outer side of the vehicle body by the slide rail mechanism, and the front door 2 and the second door 3 are supported from the below at the drawn position, and are moved along the rail or the guide groove so as to be opened and closed.

Figure 8:
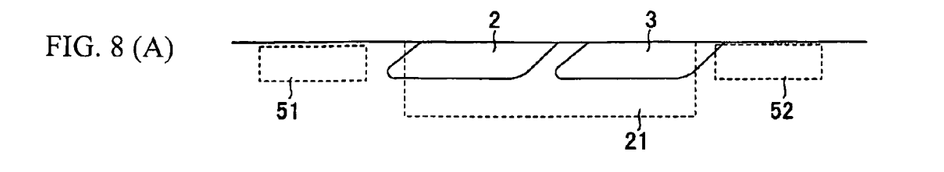
FIG. 8 is a plan view showing a positional relation at a time of opening and closing a slide door of a second exemplary embodiment of the slide door structure according to the present invention.
Figure 9:
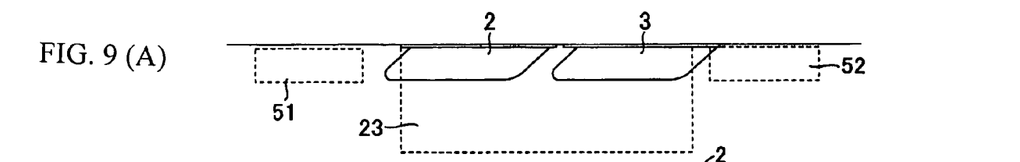
FIG. 9 is a plan view showing the positional relation at a time of opening and closing the slide door of the second embodiment of the slide door structure according to the present invention.

FIGS. 8 and 9 are plan schematic views showing a positional relation between lower rail boards 21 and 23 according to the second exemplary embodiment, and the front door 2, the rear door 3 and the vehicle body. FIG. 8 shows a case of the narrow lower rail board 21, and FIG. 9 shows a case of the wide lower rail board 23. The narrow lower rail board 21 is structured such that a width of a portion drawn out to the outer side of the vehicle body is approximately equal to a width of the door 2 or 3, and the wide lower rail board 23 is structured such that a width of a portion drawn out to the outer side of the vehicle body is approximately twice the width of the door 2 or 3. In this case, positions of front wheels 51 and rear wheels 52 are simultaneously shown.

FIGS. 8A and 9A show a state in which both the doors 2 and 3 are closed, in which the lower rail boards 21 and 23 are accommodated below the vehicle body between the front wheel 51 of the front wheel house and the rear wheel 52 of the rear wheel house. FIGS. 8B and 9B show a state in which the lower rail boards 21 and 23 are drawn out to the outer side of the vehicle body, and the front door 2 is opened.

FIGS. 8C and 9C show a state in which the lower rail boards 21 and 23 are drawn out to the outer side of the vehicle body, sub rail boards 22 and 24 provided in the lower rain boards 21 and 23 are further drawn out to the rear side in a direction extending along the vehicle body, and the rear door 3 is opened while being guided along rails (guide grooves) on the sub rail boards 22 and 24.

Further, FIGS. 8D and 9D show a state in which both the doors 2 and 3 are open.

Figure 10:
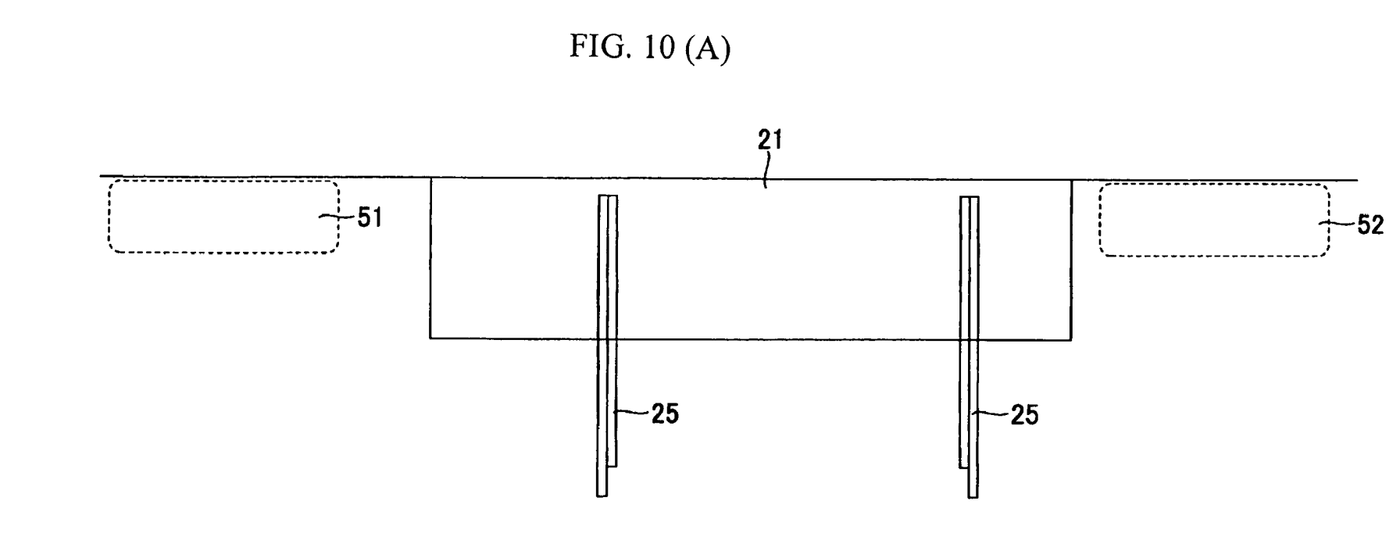
FIG. 10 is a plan view showing a state in which a lower rail board is drawn out of a vehicle body in the second embodiment.
Figure 11:
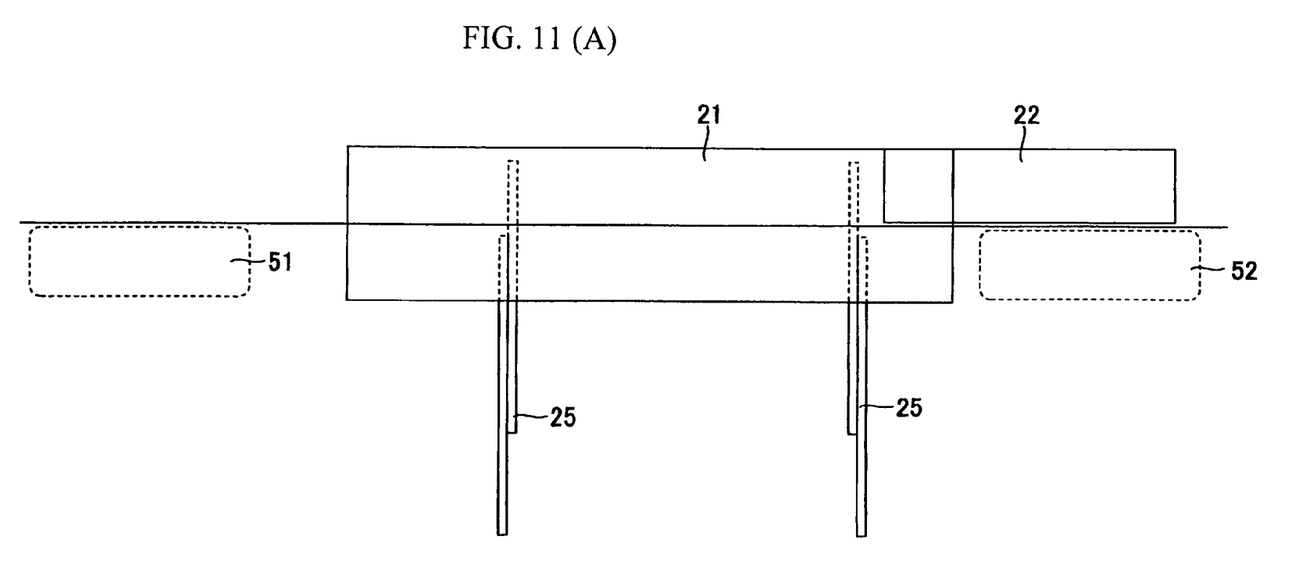
FIG. 11 is a plan view showing the state in which the lower rail board is drawn out of the vehicle body in the second embodiment.

FIGS. 10 and 11 show a state in which the lower rail board 21 is drawn out to the outer side of the vehicle body. The lower rail board 21 is accommodated between the front wheel 51 and the rear wheel 52 below the vehicle body as shown in FIG. 10 at a time of being accommodated. At a time of opening the doors 2 and 3, the lower rail board 21 is slid to the side portion of the vehicle body by the slide rail 25 so as to be drawn out as shown in FIG. 11. Further, the sub rail board 22 is drawn out along the vehicle body vertically to the lower rail board 21 after drawing out the lower rail board 21, whereby the under supporting structure ef the doors 2 and 3 is structured.

In this case, the lower rail board 21 and the sub rail board 22 can be driven by a driving motor or the like (not shown).

Figure 12:
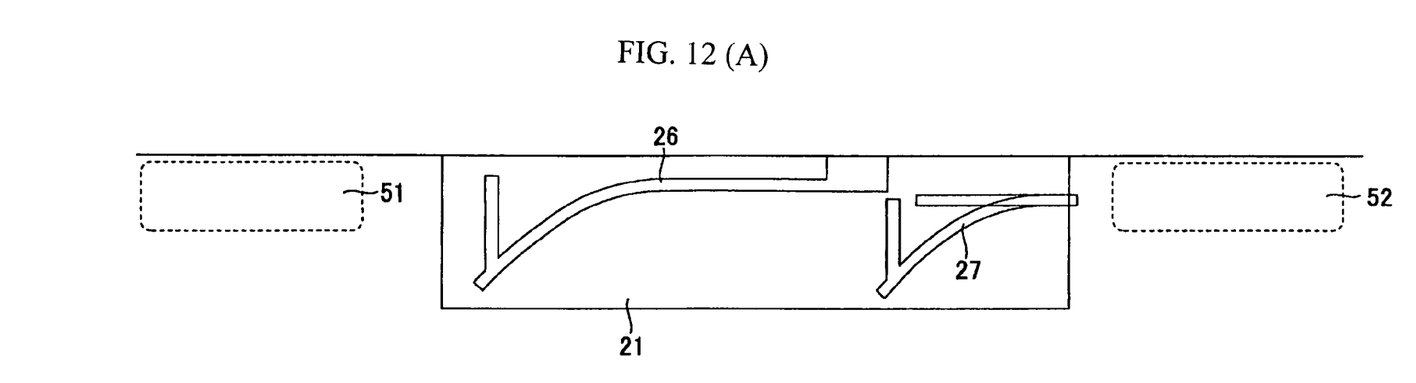
FIG. 12 is a plan view showing a structure of a guide groove on the lower rail board in the second embodiment.

Guide grooves 26 to 28 are provided, as shown in FIG. 12, on the under supporting structure of the doors 2 and 3 constituted of the lower rail board 21 and the sub rail board 22 structured, as mentioned above.

FIG. 12A is a schematic view of a state in which the lower rail board 21 is accommodated below the vehicle body, and there are shown the guide groove 26 for the front door 2 provided in the lower rail board 21 and a part of the guide groove 27 for the rear door 3. FIG. 12B shows a state in which the sub rail board 22 is drawn out after drawing out the lower rail board 21, and there is shown a rear half portion 28 of the guide groove for the rear door 3 provided in the sub rail board 22.

Figure 13:
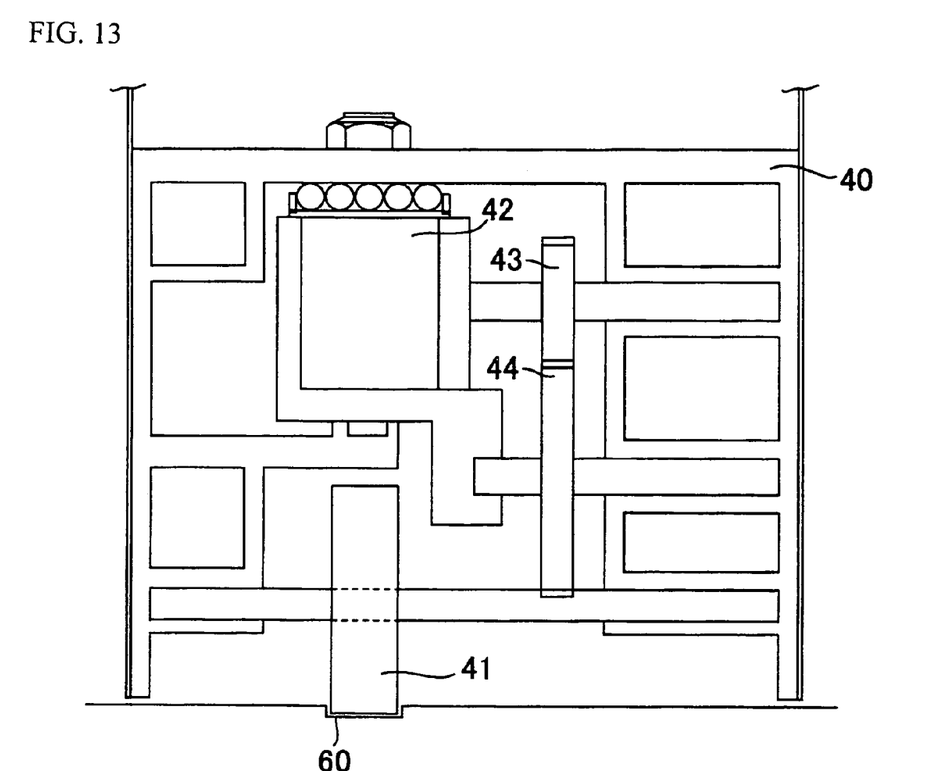
FIG. 13 is a cross sectional view showing a driving portion of a supporting and driving mechanism in the second embodiment.
Figure 14:
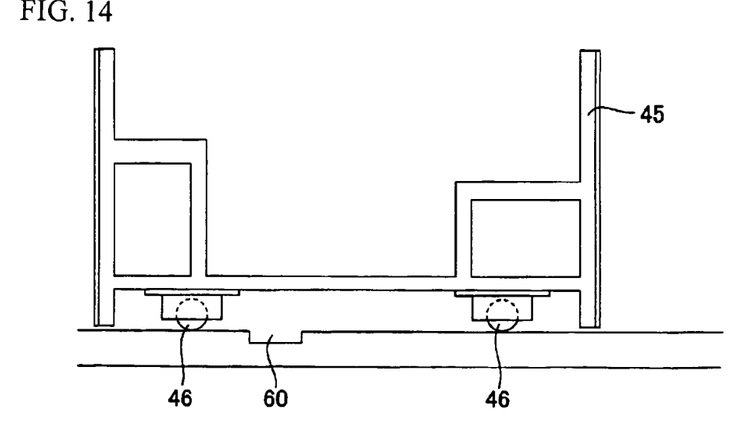
FIG. 14 is a cross sectional view showing a caster portion of the supporting and driving mechanism in the second embodiment.
Figure 15:
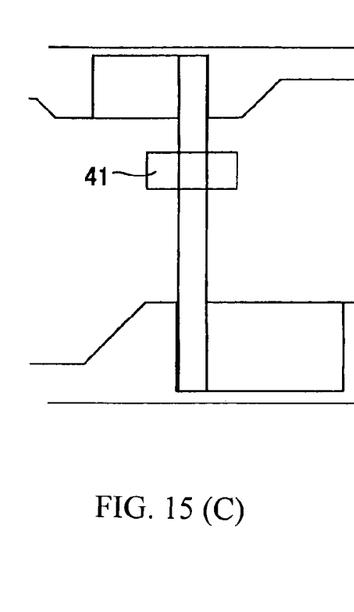
FIG. 15 is an explanatory view showing a rotation of a driving wheel of the driving portion shown in FIG. 13.

FIGS. 13 and 14 show an embodiment of a supporting and driving mechanism driving the front door 2 and the rear door 3 so as to move along the guide grooves 26, 27 and 28. In this case, in FIGS. 13 and 14, cross sections of the guide grooves 26, 27 and 28 are indicated by reference numeral 60.

FIG. 13 is a cross sectional view of a driving portion 40 of the supporting and driving body provided in the front side lower surface of the doors 2 and 3. The driving portion 40 is formed in such a manner that a width thereof is within a thickness of the doors 2 and 3, a rotation of the motor 42 is connected to a driving wheel 41 via gears 43 and 44, and the driving wheel 41 is rotated and moved within the guide grooves 26, 27 and 28 indicated by the cross section 60 in FIG. 13, thereby driving the doors 2 and 3 so as to open and close.

A movable portion constituted of the motor 42, the gears 43 and 44 and the driving wheel 41 of the driving portion 40 is structured to be rotatable within a frame of the driving portion 40. Accordingly, it is possible to rotate the driving wheel 41 to positions A, B and C in FIG. 15 with respect to the width of the doors 2 and 3, and it is possible to move the doors 2 and 3 to the front side and the rear side while accurately following the guide grooves 26, 27 and 28 so as to open and close.

FIG. 13 is a cross sectional view of a caster portion 45 of a supporting and driving body provided in a rear side of the doors 2 and 3. The caster portion 45 is also formed in such a manner that a width thereof is within the thickness of the doors 2 and 3.

A ball caster 46 is provided on a lower surface of the caster portion 45 in such a manner as to overstride the guide grooves 26, 27 and 28 in which the cross sections are shown in FIG. 13, and is structured such as to move while following to the motion of the driving portion 40, thereby smoothly moving the doors 2 and 3.

In this case, in the narrow lower rail board 21, the front door 2 can be opened only to a position in FIG. 8B by the guide groove 26, however, can be moved to a fully opened position in FIG. 8D by using guide rails provided at edges of the lower rail board 21 and the sub rail board 22 together.

The description is given above of the narrow lower rail board 21 and the sub rail board 22, however, in the wide lower rail board 23 and the sub rail board 24, the doors 2 and 3 can be guided by providing the same guide grooves.

As mentioned above, because the structure is made such that the front door 2 and the rear door 3 of the slide door are supported and guided by the guide grooves 26, 27 and 28 provided in the lower rail boards 21 and 23 and the sub rail boards 22 and 24, both the front door 2 and the rear door 3 can be slid to the rear side of the rear wheel house so as to be opened, and it is possible to secure the opening wide. Accordingly, there can be obtained the same effect as the first embodiment, such as the effect that it is possible to safely and easily get in and out of the vehicle parked in the narrow parking space.

INDUSTRIAL APPLICABILITY

Because the slide door structure according to the present invention is realized as mentioned above, the slide door structure can be used in the general passenger car, wagon type car and the like, in addition to the special type of automobile, and can be widely utilized in an automobile industry.

The invention claimed is:

1. A slide door structure of an automobile supporting front and rear slide doors by a plurality of lower rail boards held by forward and backward link mechanisms from a lower side of a vehicle body, wherein a forward side lower rail board of the plurality of lower rail boards exists in a lower portion of said vehicle body in a front side of a rear wheel house at a door closed time in a state in which said slide doors are closed, and is moved in a rear direction in an outer side of said vehicle body from the front side of said rear wheel house, on the basis of a rotation of the forward link mechanism at a door open time in a state in which said slide doors are opened, and wherein a rear side lower rail board of the plurality of lower rail boards exists in the lower portion of said vehicle body in a rear side of the rear wheel house at a door contained state in which said slide doors are closed, and is moved in a front direction in the outer side of said vehicle body from the rear side of said rear wheel house on the basis of a rotation of the backward link mechanism at a door expanded time in a state in which said slide doors are opened.

2. The slide door structure of an automobile according to claim 1, wherein said rear door is guided by a first upper guide rail provided in an upper side portion of said vehicle body, a first center guide rail provided in a side portion of said vehicle body, and a first lower guide rail provided in common in a front side lower rail board for the rear door and a rear side lower rail board for the rear door, and slides in the rear direction at a time of being opened and in the front direction at a time of being closed, and said front door is guided by a second upper guide rail provided in an upper side portion of said vehicle body, a second center guide rail provided in said rear door side portion and a second lower guide rail provided in a front side lower rail board for the front door, and slides in the rear direction at a time of being opened and in the front direction at a time of being closed.

3. The slide door structure of an automobile according to claim 2, wherein said slide doors are supported by support arms to a main body of said vehicle body, and the support arms slide in the rear direction after being drawn out to an outer side from said vehicle body side portion only by a predetermined distance from a position at which said slide doors are closed, at a time of opening said slide doors.

4. A slide door structure of an automobile supporting front and rear slide doors from a lower side of a vehicle body by a lower rail board guided by a slide rail mechanism, wherein said lower rail board exists in a lower portion of said vehicle body in a front side of a rear wheel house at a door closed time in a state in which said slide doors are closed, and is moved toward an outer side of said vehicle body by said slide rail mechanism, and a sub rail board provided in said lower rail board is moved to a rear side of the vehicle from said lower rail board so as to support said slide doors.

5. The slide door structure of an automobile according to claim 4, wherein driving wheels provided in a lower surface in a front side of both of the slide doors are guided and moved by guide grooves provided in said lower rail board and said sub rail board so as to be opened and closed.

* * * * *